United States Patent [19]
Edmunds et al.

[11] Patent Number: 5,477,317
[45] Date of Patent: Dec. 19, 1995

[54] ADAPTIVE EXPOSURE COLOR CORRECTION

[75] Inventors: Cyril G. Edmunds; William L. Lama, both of Webster, N.Y.

[73] Assignee: Xerox Corporation, Stamford, Conn.

[21] Appl. No.: 927,751

[22] Filed: Aug. 10, 1992

[51] Int. Cl.$^6$ ............................................. G03G 15/01
[52] U.S. Cl. .................... 355/326 R; 355/208; 358/448; 358/455; 358/461
[58] Field of Search ............................ 355/200, 210, 355/219, 326 R, 327, 328, 204, 208; 358/405, 75, 80, 448, 455, 457, 461; 346/160

[56] References Cited

U.S. PATENT DOCUMENTS

| | | | |
|---|---|---|---|
| 4,236,809 | 12/1980 | Kermisch | 355/326 |
| 4,366,500 | 12/1982 | Kurtz et al. | 358/75 |
| 4,403,848 | 9/1983 | Snelling | 355/327 |
| 4,599,285 | 7/1986 | Haneda et al. | 430/54 |
| 4,679,929 | 7/1987 | Haneda et al. | 355/265 |
| 4,700,320 | 10/1987 | Kapur | 364/518 X |
| 4,791,455 | 12/1988 | Yamamoto et al. | 355/303 |
| 4,809,038 | 2/1989 | Yamamoto et al. | 355/327 |
| 4,816,863 | 3/1989 | Lee | 355/208 |
| 4,833,503 | 5/1989 | Snelling | 355/259 |
| 4,839,722 | 6/1989 | Barry et al. | 358/80 |
| 4,927,724 | 5/1990 | Yamamoto et al. | 430/45 |
| 4,929,978 | 5/1990 | Kanamori et al. | 355/38 |
| 4,937,635 | 6/1990 | Paxton et al. | 355/326 |
| 4,941,003 | 7/1990 | Takeda et al. | 346/160 |
| 4,945,406 | 7/1990 | Cok | 358/80 |
| 4,949,125 | 8/1990 | Yamamoto et al. | 355/219 |
| 4,953,012 | 8/1990 | Abe | 358/75 |
| 5,023,632 | 6/1991 | Yamamoto et al. | 346/157 |
| 5,057,936 | 10/1991 | Bares | 358/405 |
| 5,065,199 | 11/1991 | Rushing | 355/326 |
| 5,066,989 | 11/1991 | Yamamoto | 355/270 |
| 5,079,115 | 1/1992 | Takashima et al. | 430/45 |

*Primary Examiner*—Sandra L. Brase
*Attorney, Agent, or Firm*—Lloyd F. Bean, II

[57] ABSTRACT

An apparatus for correcting color images in an electrophotographic printing machine in which a first image is developed on a photoconductive surface, the second and subsequent images are superimposed over the first developed image. The apparatus includes an input device for inputting an image signal having a plurality of color components. An image processing unit processes the inputted signal. The image processing unit includes an adaptive exposure processor that modulates the exposure level of a raster output scanner (ROS) for a given pixel as a function of toner previously developed at the pixel site, thereby allowing toner layers to be made independent of each other.

6 Claims, 12 Drawing Sheets

ADAPTIVE EXPOSURE COLOR CORRECTION

FIELD OF THE INVENTION

This invention relates generally to an electrophotographic printing machine, and, more particularly, concerns a method and apparatus for correcting color images being reproduced by the electrophotographic printing process.

BACKGROUND OF THE INVENTION

The quality or acceptability of a color copy is a function on how the human eye and mind receives and perceives the colors of the original and compares it to the colors of the copy. The human eye has three color receptors that sense red light, green light, and blue light. These colors are known as the three primary colors of light. These colors can be reproduced by one of two methods, additive color mixing and subtractive color mixing, depending on the way the colored object emits or reflects light.

In the method of additive color mixing, light of the three primary colors is projected onto a white screen and mixed together to create various colors. A well known exemplary device that uses the additive color method is the color television. In the subtractive color method, colors are created from the three colors yellow, magenta and cyan, that are complementary to the three primary colors. The method involves progressively subtracting light from white light. Examples of subtractive color mixing are color photography and color printing. Also, it has been found that electrophotographic printing machines are capable of building up a full subtractive color image from cyan, magenta, yellow and black. They can produce a subtractive color image by one of three methods. One method is to transfer the developed image of each color on an intermediary, such as a belt or drum, then transferring all the images superimposed on each other on a sheet of copy paper. A second method involves developing and transferring an image onto a sheet of copy paper, then superimposing a second and subsequent images onto the same sheet of copy paper. The third method which will be discussed, infra, in detail involves superimposing developed images on each other on the same photoconductive surface.

In a typical, monochrome electrophotographic printing machine, the surface of a rotating belt or drum is electrically charged; the surface is selectively discharged by light from an original document to be copied to record a charge pattern corresponding to the original document; toner is electrically attracted to the charge pattern; toner is transferred from the charge pattern to the sheet of copy paper; the toner is permanently fused to the sheet of copy paper; and the remaining toner is cleaned from the photoconductive surface.

Color copies can be produced by repeating the monochrome electrophotographic printing machine process for different colors. This can be accomplished by using four development stations containing cyan, magenta, yellow and black toners. A subtractive color image can be produced by utilizing the Recharge, Expose, and Develop (READ) process. In this process, the light reflected from the original is first converted into an electrical signal by a raster input scanner (RIS), subjected to image processing, then reconverted into a light, pixel by pixel, by a raster output scanner (ROS) which exposes the charged photoconductive surface to record a latent image thereon corresponding to the substractive color of one of the colors of the appropriately colored toner particles at a first development station. The photoconductive surface with the developed image thereon is recharged and re-exposed to record a latent image thereon corresponding to the subtractive primary of another color of the original. This latent image is developed with appropriately colored toner. This process (READ) is repeated until all the different color toner layers are deposited in superimposed registration with one another on the photoconductive surface. The multi-layered toner image is transferred from the photoconductive surface to a sheet of copy paper. Thereafter, the toner image is fused to the sheet of copy paper to form a color copy of the original.

In a monochrome electrophotographic printing process, suitable controls maintain a substantially constant relationship between exposure and developed mass per area of photoconductive surface. Multi-pass/multi-transfer color systems have this same property since the photoconductive surface is cleaned between passes, i.e. between successive exposures. In the REaD color process, the photoconductive surface is not cleaned between exposure steps. It has been found that between successive exposures, the amount of developed mass of toner on the photoconductive surface for a selected exposure level is a function of the amount of toner previously developed on the photoconductive surface. Basically, three factors contribute to the amount of developed mass of toner on the photoconductive surface. First, the toner backscatters or absorbs some of the incident light, thus decreasing exposure at the photoconductive surface. Second, the voltage drop across the developed toner layer cannot be photo-discharged, and, thus, detracting from the total amount of voltage available for development. Third, the dielectric thickness of the previously developed toner reduces the amount of charge which can be deposited before the electric field driving the development process collapses to zero.

FIG. 9 shows graphs of developed mass per area (DMA) as a function of position for line screens of various duty cycles of an electrophotographic printer utilizing REaD process color employing a ROS having the beam intensity set to optimize line screen performance on a bare photoreceptor. The intensity of the ROS beam is set in such a way that images deposited on a previously bare photoreceptor (left hand column) are relatively "faithful"—i.e., the duty cycle of the developed lines is similar to the duty cycle of the ROS beam. However, the same beam intensity on a previously developed area produces lines which are less well developed and narrower. The ultimate result of this effect is a loss in color gamut because the second toner layer can never fully develop.

FIG. 10 also shows graphs of DMA as a function of position for line screens of various duty cycles for an electrographic printer utilizing REaD process color employing a ROS having the beam intensity set to optimize performance on a previously toned photoreceptor. By increasing the beam intensity over what was used in FIG. 9, one can recover, approximately, both the height and width of the developed lines. The color gamut is now restored, but imaging on a bare photoreceptor is no longer faithful. The lines are broadened by the increased beam intensity resulting in premature saturation. This results in a loss of halftone levels which can result in a harsh looking image, Moire' patterns or even contours which are visible shifts in color between adjacent stops in the halftone screen. FIG. 11 is a summary of FIGS. 9 and 10 in the form of DMA vs. duty cycle curves. FIG. 11 shows the effects of a ROS beam intensity in a REaD process color set to optimize line screen performance on a bare photoreceptor and when a ROS beam intensity is set to optimize performance on a previously toned photoreceptor.

Various techniques for reproducing color documents and correcting color images have hereinbefore been devised as illustrated by the following disclosures, which may be relevant to certain aspects of the present invention:

U.S. Pat. No. 4,236,809 Patentee: Kermisch issued: Dec. 2, 1980

U.S. Pat. No. 4,403,848 Patentee: Snelling issued: Sep. 13, 1983

U.S. Pat. No. 4,599,285 Patentee: Haneda et al. issued: Jul. 8, 1986

U.S. Pat. No. 4,679,929 Patentee: Haneda et al. issued: Jul. 14, 1987

U.S. Pat. No. 4,791,455 Patentee: Yamamoto et al. issued: Dec. 13, 1988

U.S. Pat. No. 4,809,038 Patentee: Yamamoto et al. issued: Feb. 28, 1989

U.S. Pat. No. 4,833,503 Patentee: Snelling issued: May 23, 1989

U.S. Pat. No. 4,839,722 Patentee: Barry et al. issued: Jun. 13, 1989

U.S. Pat. No. 4,927,724 Patentee: Yamamoto et al. issued: May 22, 1990

U.S. Pat. No. 4,929,978 Patentee: Kanamori et al. issued: May 29, 1990

U.S. Pat. No. 4,941,003 Patentee: Takeada et al. issued: Jul. 10, 1990

U.S. Pat. No. 4,949,125 Patentee: Yamamoto et al. issued: Aug. 14, 1990

U.S. Pat. No. 4,953,012 Patentee: Abe issued: Aug. 28, 1990

U.S. Pat. No. 5,023,632 Patentee: Yamamoto et al. issued: Jun. 11, 1991

U.S. Pat. No. 5,066,989 Patentee: Yamamoto issued: Nov. 19, 1991

U.S. Pat. No. 5,079,115 Patentee: Takashima et al. issued: Jan. 7, 1992

The relevant portions of the foregoing patents may be briefly summarized as follows:

U.S. Pat. No. 4,236,809 discloses a method in which an optical latent image is corrected for tone or color in real time by a parallel raster exposure arrangement. A raster input scanner (RIS) generates electrical raster image signals representative of the original. A processor converts electrical correction signals according to prescribed scheme, i.e., in parallel or additive mode from the raster image signals. A raster output scanner (ROS) generates a raster latent image generated in registration with the optical latent image in response to the electrical correction signals.

U.S. Pat. Nos. 4,403,848, 4,599,285, 4,679,929, 4,791, 455, 4,809,038, 4,833,504, 4,927,724, 4,941,003, 4,949,125, 5,023,632, 5,066,989 and 5,079,155 discloses various methods of forming color copies, where a first image is formed and developed on a photoconductive surface, the steps above are repeated to superimpose a plurality of toner images on the photoconductive surface, and the toner images is transferred on a copy sheet by one step.

U.S. Pat. No. 4,839,722 discloses a color correction apparatus for a color copier, where the apparatus utilizes a 3-dimensional look-up table of pigment density values addressed by primary color values. The look-up table is created by printing a plurality of pigment bars in response to known input density signals to a laser beam for each of three color pigments used in the system.

U.S. Pat. No. 4,929,978 discloses a color correction method for color copier where a set of color patches of respectively different sample colors is printed using a set of printing data values, the color patches are then scanned and analyzed to obtain color patch input data values by the color copier, and each of all of the possible input color data values that can be produce by the scanner/analyzer section of the color copier is then related to one of the color patch input data values which is closest thereto in a 3-dimensional color space.

U.S. Pat. No. 4,953,012 discloses an image processing system which can produce a color image by developing the image on a photoconductive surface and transferring an image onto a sheet of copy paper, then superimposing a second and subsequent images onto the same sheet of copy paper. A processor processes the image signal input by the first input device to reproduce a color image from the color components and includes a half-tone processing section for half-tone processing of the image signal. A discriminator discriminates the presence of a specific color component, half-tone portion, and line image portions in the image signal in accordance with the result of discrimination of the specific color component. A selector selects a predetermined sequence for processing by the processor of the image signal having the specific color component to reproduce a color image with the specific color component in accordance with the result of discrimination by said discrimination means.

SUMMARY OF THE INVENTION

In accordance with one aspect of the present invention, there is provided an electrophotographic printing machine which includes a photoconductive member. Means are provided for charging the photoconductive member. Means input an image signal. Means are provided for processing the inputted image signal, the image processing means adjust the inputted image signal. Means responsive to the image signal, expose the charged photoconductive member for recording an electrostatic latent image thereon. Means develop the electrostatic latent image with toner of a first color during a first cycle and toner of a second color during a second cycle to form a composite toner image on the photoconductive member. Means transfer the composite toner image from the photoconductive member to a copy sheet.

Pursuant to another aspect of the present invention, there is provided a method of producing a color copy in an electrophotographic printing machine, including the steps of inputting an image signal including a plurality of color components. The inputted image signal is processed to adjust the image signal exposure level. A charged photoconductive surface is exposed to record an electrostatic, latent image thereon. The step of exposing is responsive to the step of processing. The latent image is developed with toner of a first color during a first cycle and toner of a second color during a second cycle to form a composite toner image on the photoconductive member. The composite toner image is transferred from the photoconductive member to a sheet.

DESCRIPTION OF THE DRAWINGS

Other aspects of the present invention will become apparent as the following description proceeds and upon reference to the drawings, in which.

While the present invention will be described in connection with a preferred embodiment and method of use thereof, it will be understood that it is not intended to limit the invention to that embodiment or method of use. On the contrary, it is intended to cover all alternatives, modifications and equivalents that may be included within the spirit and scope of the invention as defined by the appended claims.

DETAILED DESCRIPTION OF THE INVENTION

Figure 8:
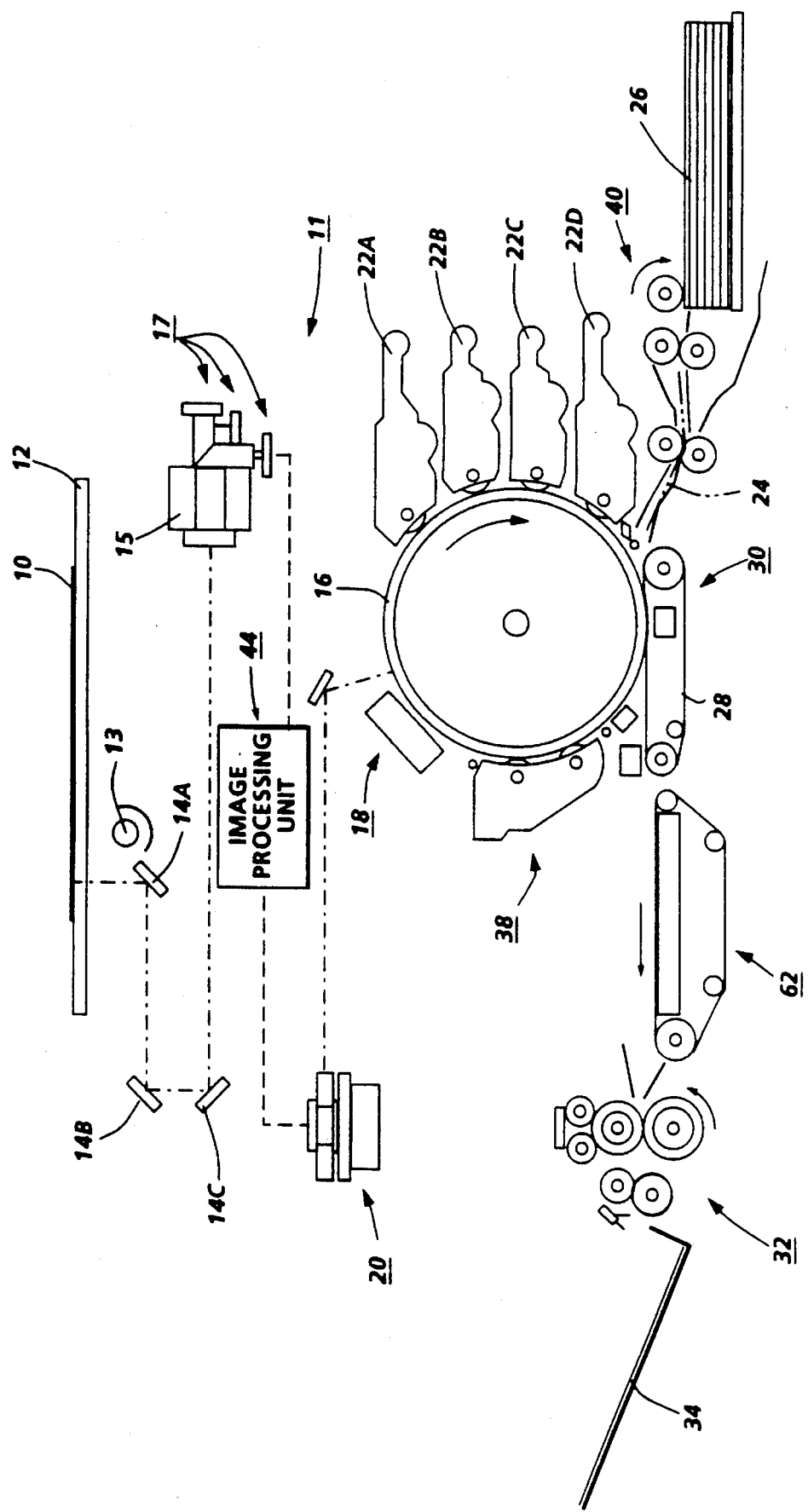
FIG. 8 is a schematic, elevational view of a color electrophotographic printing machine that incorporates the adaptive processing unit of the present invention therein.

For a general understanding of the features of the present invention, reference numerals have been used throughout to designate identical elements. FIG. 8 schematically depicts the various elements of an illustrative color electrophotographic printing machine incorporating the present invention therein. It will become evident from the following discussion that the present invention is equally well suited for use in a wide variety of printing machines and is not necessarily limited in its application to the particular embodiment depicted herein.

Inasmuch as the art of electrophotographic printing is well known, the various processing stations employed in the FIG. 8 printing machine will be shown hereinafter schematically and their operation described briefly with reference thereto.

Turning now to FIG. 8, there is shown a color/document imaging system incorporating the adaptive exposure processing unit of the present invention. The color copy process can begin by either inputting a computer generated color image into the image processing unit 44 or by way of example, placing a color document 10 to be copied on the surface of a transparent platen 12. A scanning assembly consisting of a halogen or tungsten lamp 13 which is used as a light source, and the light from it is exposed onto the color document 10; the light reflected from the color document 10 is reflected by the 1st, 2nd, and 3rd mirrors 14a, 14b and 14c, respectively, then the light passes through lenses (not shown) and a dichroic prism 15 to three charged-coupled devices (CCDs) 17 where the information is read. The reflected light is separated into the three primary colors by the dichroic prism 15 and the CCDs 17. Each CCD 17 outputs an analog voltage which is proportional to the strength of the incident light. The analog signal from each CCD 17 is converted into an 8-bit digital signal for each pixel (picture element) by an analog/digital converter. The digital signal enters an image processing unit 44. The digital signals which represent the blue, green, and red density signals are converted in the image processing unit into four bitmaps: yellow (Y), cyan (C), magenta (M), and black (Bk). The bitmap represents the value of exposure for each pixel, the color components as well as the color separation. Image processing unit 44 has a shading correction unit, an undercolor removal unit (UCR), a masking unit, a dithering unit, a gray level processing unit, and an adaptive exposure processing unit. The image processing unit 44 can store bitmap information for subsequent images or can operate in a real time mode.

The photoconductive surface, preferably a drum 16, is charged by charging unit 18. During the first REaD cycle, a raster output scanner (ROS) 20, controlled by image processing unit 44, writes a first complementary color image bitmap information by selectively erasing charges on the drum 16. The ROS 20 writes the image information pixel by pixel in a line screen registration mode. By way of example, the first color development unit, yellow unit 22a, is cammed near the drum 16, thereby allowing the toner to adhere to the latent image on the drum 16 as the drum 16 rotates in a clockwise direction. The other development units magenta 22b, cyan 22c and black 22d, respectively, are cammed away from the drum 16 so that toner from these units does not adhere to the drum 16. The development takes place for the second and subsequent colors by rotating and recharging drum 16 with charging unit 18. The developed latent image on the drum 16 is rotated to register the drum 16 in the same position as the initial image. The second REaD cycle begins when the ROS 20 re-exposes the drum 16 by superimposing a second color image bitmap information over the previous developed latent image. The ROS 20 exposure level for each pixel of the image is modulated in accordance to the amount of previously developed toner by the image processing unit 44 via the modulator (not shown). The ROS output can be modulated by either changing the analog exposure value or employing pulse width modulation. Preferably, during subsequent exposure, the image is re-exposed in a line screen registration oriented along the process or slow scan direction. This orientation reduces motion quality errors and allows the adaptive exposure processor unit of image processing unit 44 to utilize near perfect transverse registration.

The development of second color magenta takes place when the second development unit 22b is cammed in and the other three development units are cammed away from drum 16, thereby allowing the second color magenta to be attracted to the first toner layer on the drum by electrostatic induction between the drum 16 and toner to be developed.

In the third REaD cycle, the color of cyan is developed by repeating the process of recharging, re-exposing and developing the previously developed image on the drum 16 with toner from the third development unit 22c.

In the fourth REaD cycle, the development of the color image is completed when the development of the fourth color black is accomplished by repeating the process of recharging, re-exposing and developing the previously developed image on the drum 16 with black toner from the fourth development unit 22d.

When the development process is completed, a sheet of copy paper 24 from the paper supply 26 is moved by the paper feeder 40 onto the transfer belt 28 which is cammed near the drum 16. The developed image and the copy paper 24 are aligned, and the developed latent image is transferred onto the paper by a transfer unit 30 located under the transfer belt which attracts the oppositely charged toner. The sheet of copy paper 24 moves to a fuser station 32 on a conveyor 62 where the toner is permanently affixed to the copy paper 24. The copy paper then moves onto an output tray 34. The color copy process is completed when cleaning station 38 is cammed in to the drum 16 to clean the drum 16 of residue toner.

It is believed that the foregoing description is sufficient for purposes of the present application to illustrate the general operation of an exemplary color electrophotographic printing machine incorporating the features of the present invention therein.

Figure 1:
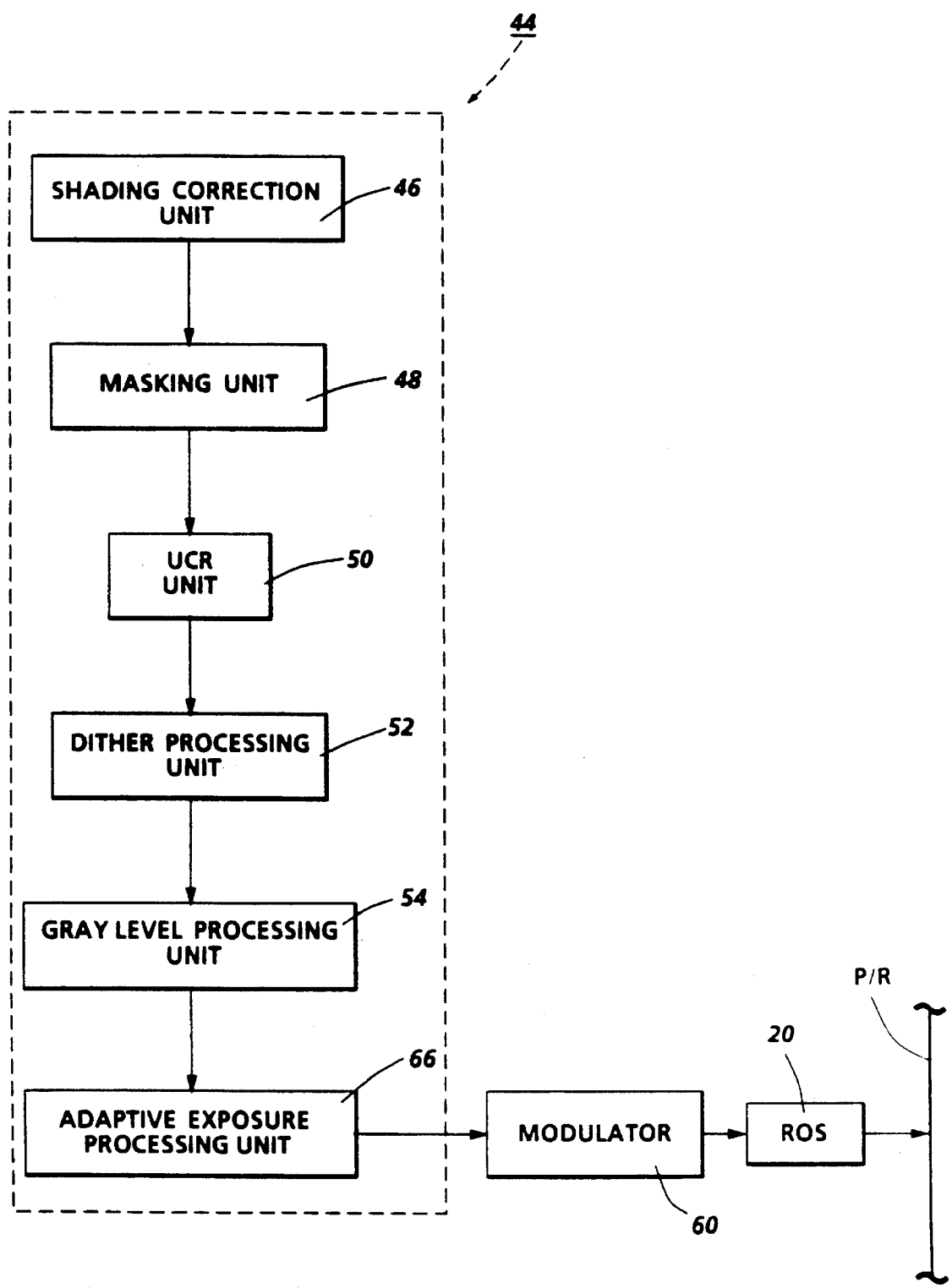
FIG. 1 is a block diagram illustrating the operation of the image processing unit which incorporates the features of the present invention therein.

Referring to FIG. 1, there is a block diagram of imaging processing unit 44. The digital signal enters the image processing unit 44, and is processed by a shading processing unit 46 to correct the tonality. A masking processing unit 48 processes the signal from the shading processing unit 46. The masking processing unit 48 evaluates data where the edges of the copy would appear. The masking processing unit 48 reduces the light side on the side of the edge and increases density on the dark side of the edge to improve edge enhancement of the copy. The signal is processed by black under color removal (UCR) processing unit 50 that reduces the cyan, magenta and yellow content in neutral areas of copy and replacing them with black so the copy will appear normal and will use less overall toner. The signal is processed by a dithering unit 52 that interpolates to fill in gaps between two pixels with another pixel to add detail or minimize the difference between the pixels. The signal is then processed by a gray level processing unit 54 that reproduces gray levels by removing from the color separations some or all of the cyan, magenta and yellow that produces the gray component of a copy. The gray amounts are replaced by increasing the black toner content in the same area. The output signal from the gray level processing unit 54 is further processed by an adaptive exposure processing unit 66 where exposure level is adjusted for each pixel by analyzing the four bitmap data, i.e. pixels for each color, and consulting a look-up table in the adaptive exposure processing unit 66. The values in the look-up table depend on: the amount and type of toner to be developed at a pixel site; the color and amounts of previously developed toner at the pixel site; the total transmittance of the previous developed toner at the pixel site; and the expected voltage drop across the previous developed toner at the pixel site. The output from the look-up table in the processor is the adaptive exposure level. The output signal from adaptive exposure process unit 66 is converted by a D/A converter which changes the digital signal from the processing units into an analog voltage which in turn is applied to a modulator 60. The modulator varies the light beam output of the ROS 20 in proportion to the applied voltage. The modulated light beam is directed by a revolving mirror (not shown) and focused by a lens (not shown) into a light spot on the charge drum 16. The light spot sweeps across the drum 16 selectively erasing the charges on the drum 16 in accordance to the corrected values determined in the image processing unit 44.

Figure 7:
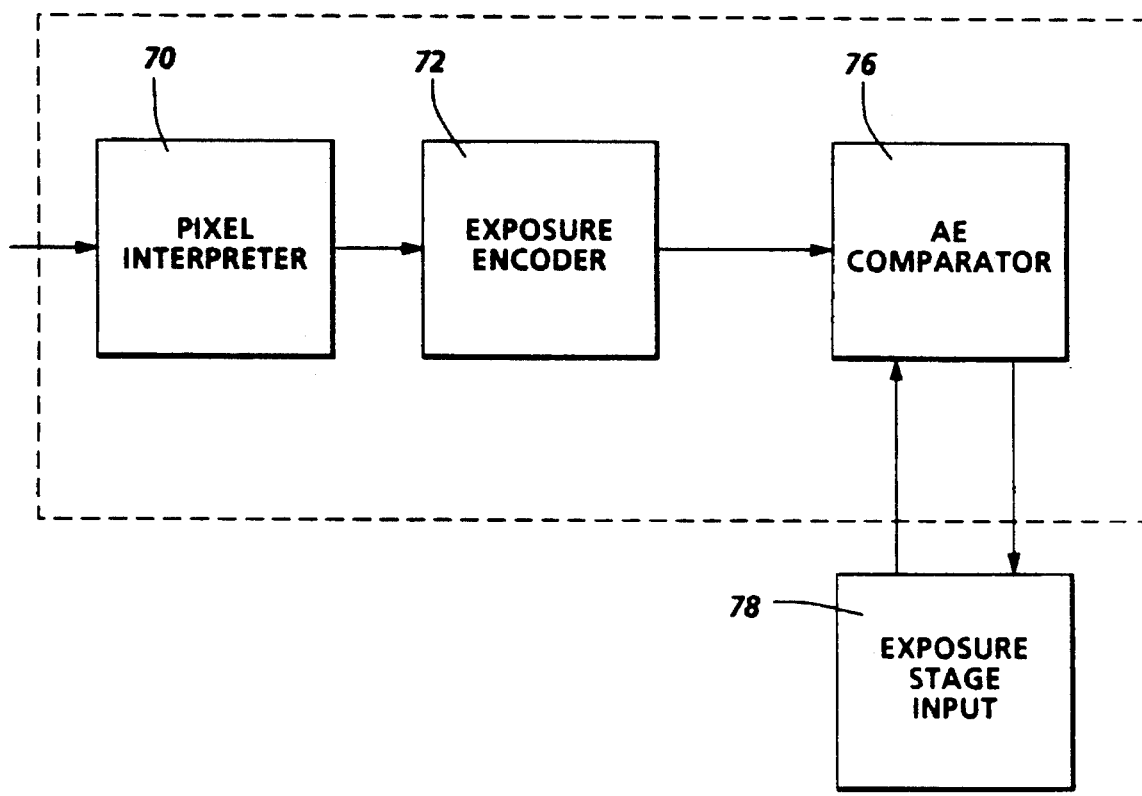
FIG. 7 is a functional block diagram of an adaptive exposure processing unit.

Referring to FIG. 7, there is a functional block diagram of an adaptive exposure processing unit 66. The image signal enters a pixel interpreter 70 which translates the image signal into four bitmaps which represent the color components for each pixel. The exposure evaluator 72 takes the components of color for each pixel and correlates the data with when the ROS will be modulated, i.e. turned on or off for each pixel of each REaD cycle. The REaD cycle information is stored in the exposure stage input 78. The adaptive exposure (AE) comparator 76 evaluates the color pixel information and the REaD cycle from the exposure stage input 78 and compares the two sources of information to an exposure level file. The exposure level file contains a look-up table where the color pixel and exposure stage input 78 correlates to a predetermine exposed level which is outputted to the modulator 60 that modulates the intensity of the light beam created by ROS 20.

Figure 2:
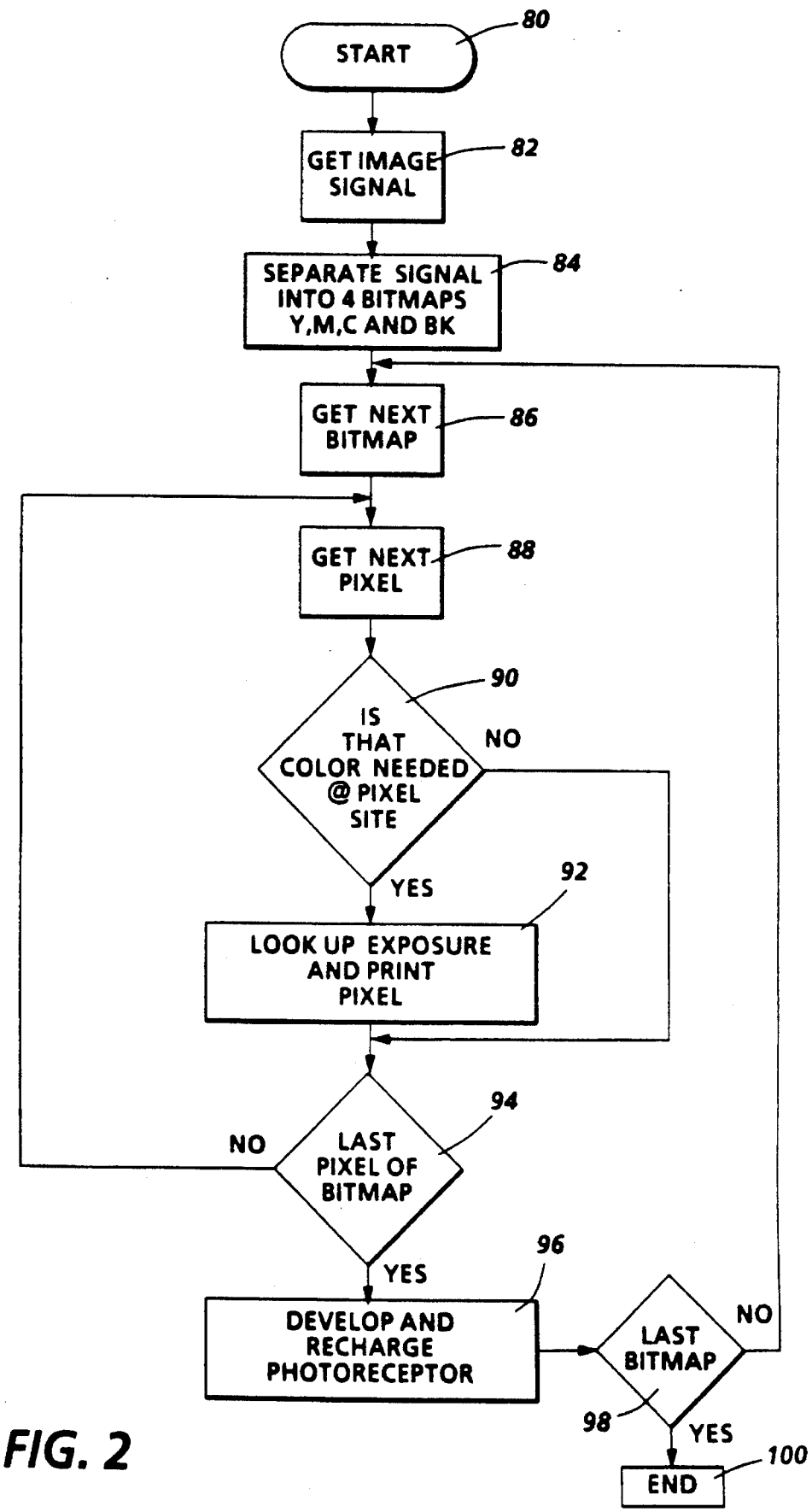
FIG. 2 is a flow diagram illustrating the operation of the adaptive exposure processing unit of the present invention.

Referring to FIG. 2, there is a flow diagram for adaptive exposure processing unit 66. Processing starts at 80 and gets the image signal at step 82. At step 84, the image signal is separated into four 256 level bitmaps (Y, M, C, and Bk) which represent the color make-up for each pixel. Data for the next bitmap is obtained at step 86 and is recorded by examining the pixel data. If the pixel data has a "1" value, which correlates to the light beam exposing the pixel site at step 90, a value in a look-up table is consulted to find the proper exposure value, and the exposure value is outputted to the modulator and printed at step 92. If the pixel data has a "0" value, which correlates to no light exposing the pixel site, then the next pixel in the bitmap is examined at step 90. It should be apparent to one skilled in the art that pixel data value could be variable in order to produce gray levels. This completes the flow diagram for one cycle of the adaptive exposure process. After the first bitmap exposure data is recorded, then the image on the photoreceptor is developed and recharged at step 96. The process ends at step 100 when data from the next three bitmaps is recorded on the photoreceptor 96 by following the above steps.

Figure 3:
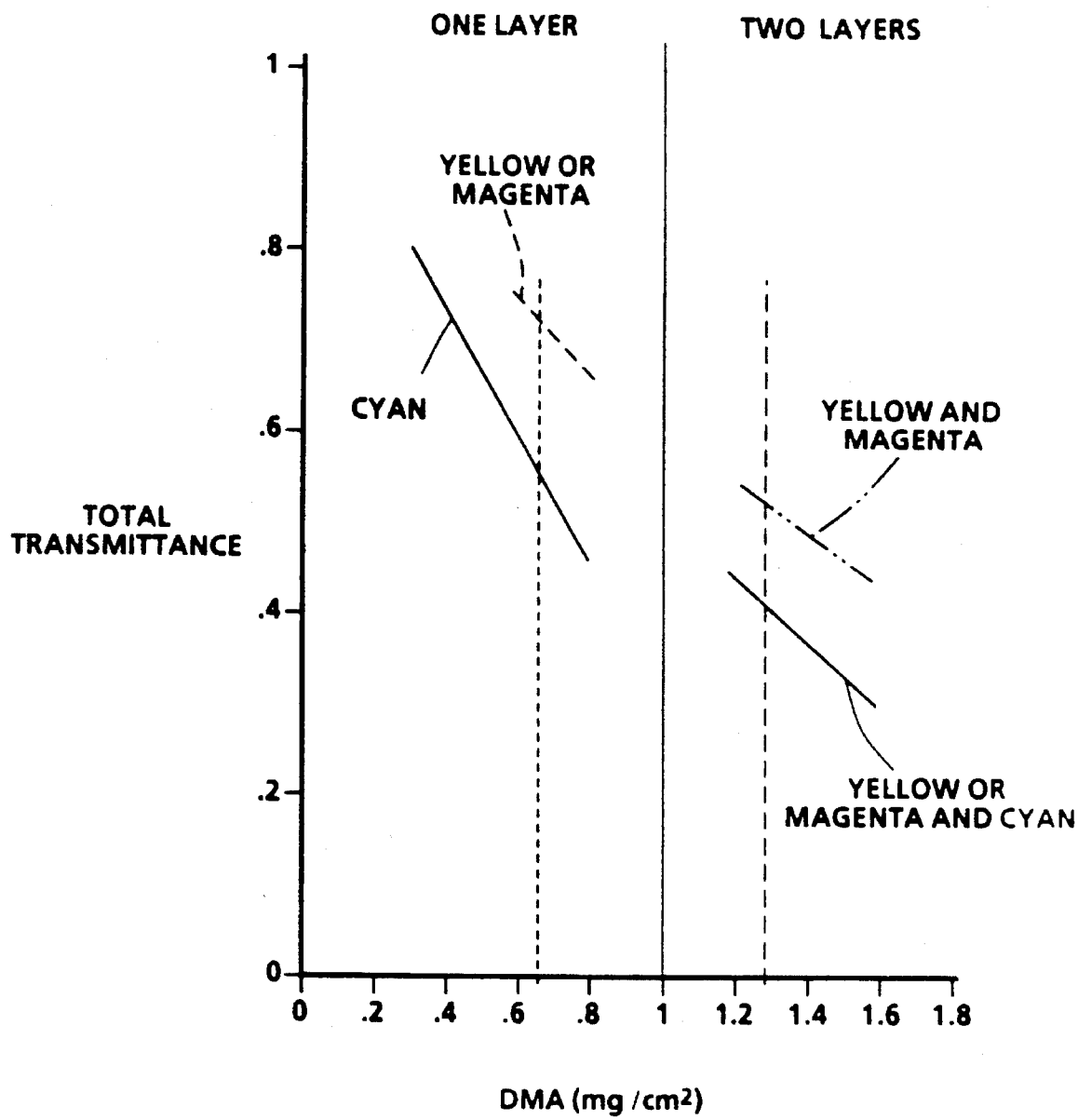
FIG. 3 is experimental data of the relationship between total transmittance and developed mass per unit area for different color toners.
Figure 4:
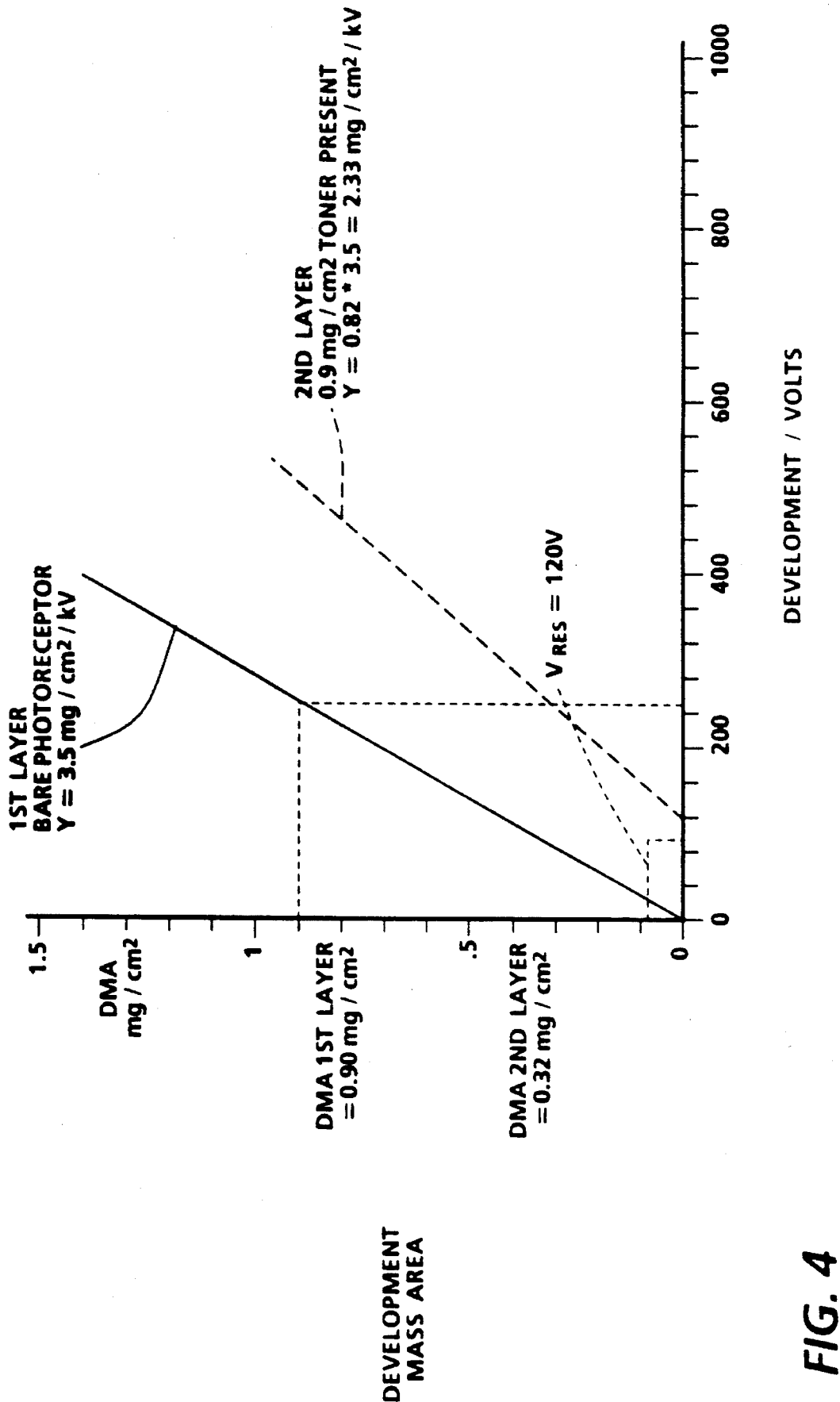
FIG. 4 is experimental data of the developed mass per unit area verus the development potential with one layer and with two layers.

The values in the look-up tables in the adaptive exposure processing unit 66 can be determined experimentally; a configuration similar to one shown in FIG. 8 was tested to find the adaptive exposure level. FIG. 3 shows the relationship between total transmittance and develop mass per unit area (DMA) at light wavelength of 780 nm, for a first layer of cyan and a first layer of yellow or magenta toner. Also, FIG. 3 shows the relationship between two layers, a layer of yellow or magenta with a layer of cyan, and two layers configuration with yellow and magenta. By way of example, if 0.65 mg/cm2 of cyan were on the photoreceptor, after the first REaD cycle, only57% of the light would be able to discharge the photoreceptor, and if 0.65 mg/cm2 layer of yellow toner is over the cyan toner, only 40% of the light would be able to discharge the photoreceptor FIG. 4 shows develop mass per unit area versus the development potential with one layer and with two layers and illustrates the following effects: First, the residual voltage on the toner offsets the developability curve to the right; second, the increased dielectric thickness decreases the developability slope of the second layer of toner. By way of example, if it was desired to have the development voltage at 250 volts for the first and second REaD cycle. During the first REaD cycle, the developed mass area would be 0.90 mg/cm$^2$ on the bare photoreceptor, and for the second REaD cycle, if the adaptive exposure process is not used, the developed mass area would be 0.32 mg/cm2

Figure 5:
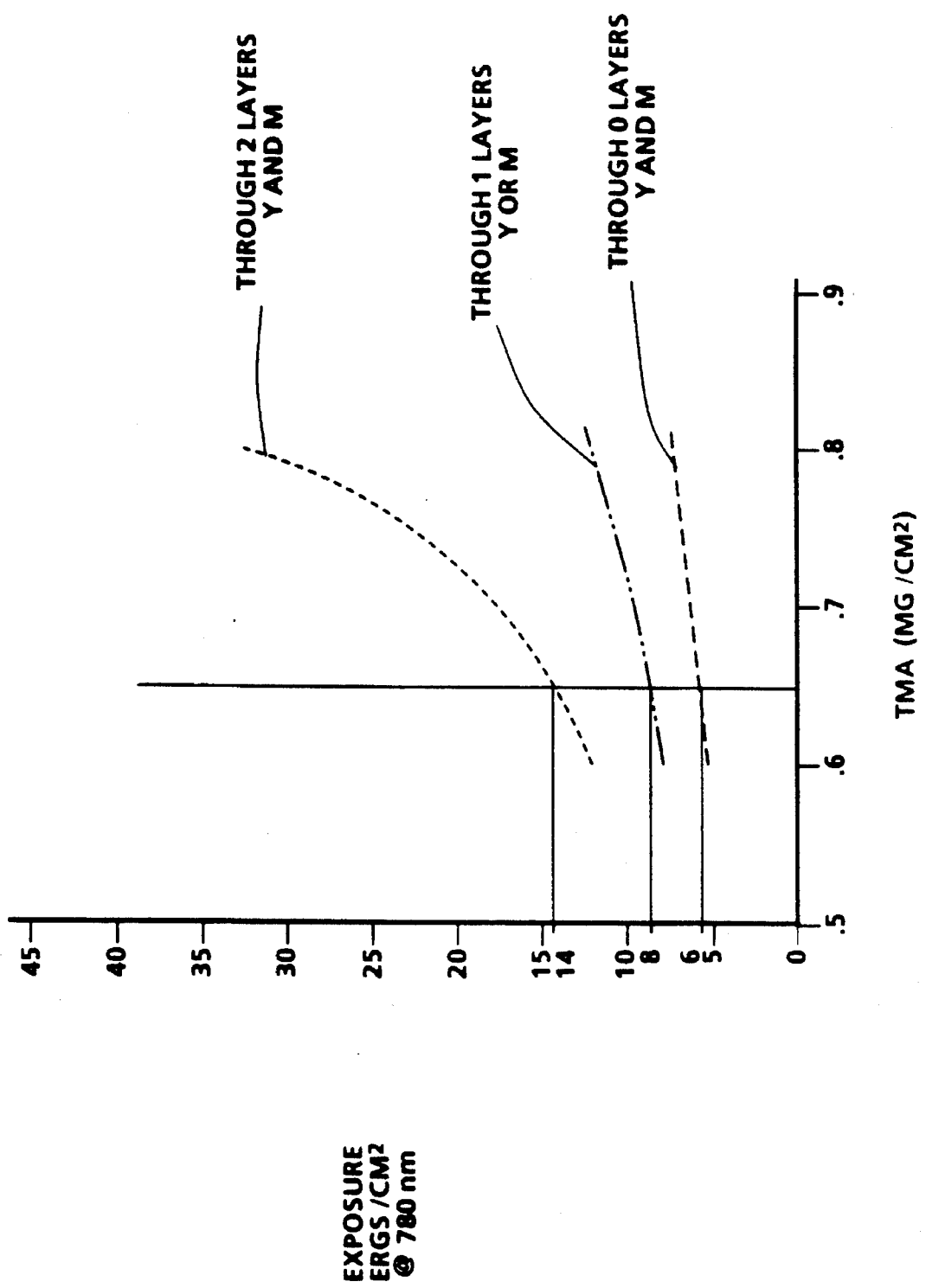
FIG. 5 is experimental data of the photo-discharge curve which shows the exposure required for a given toner mass with the photoconductive surface at 800 volts and an image being transmitted through yellow and magenta toner.

One way to compensate for the effects of decreasing exposure at the photoconductive surface (as illustrated in FIG. 3) caused by the incident light being backscattered or absorbed by toner on the photoreceptor and the effect of the voltage drop across the developed toner layer which cannot be photo-discharged, and, thus, detracting from the total amount of voltage available for development (as illustrated in FIG. 4), is to adaptively change the exposure for each pixel depending on the previous toner developed at the pixel site. FIG. 5 is data of three photo-discharge curves illustrating the exposure required for a given toner mass per unit area (TMA) with the development potential at 800 volts through zero layers of yellow and magenta to two layers of yellow and magenta. By way of example, if it was desired to have three equal layers of yellow, magenta and another color such as cyan or black at a TMA of 0.65 mg/cm$^2$, one would have to expose the drum to an exposure of 6 ergs/cm$^2$ for the initial layer of yellow or magenta on the drum, then for the next layer of yellow or magenta one would have to use an adaptive exposure of 8 ergs/cm$^2$, and, then to add a third layer, an adaptive exposure of 14 ergs/cm$^2$ would be needed.

Figure 6A:
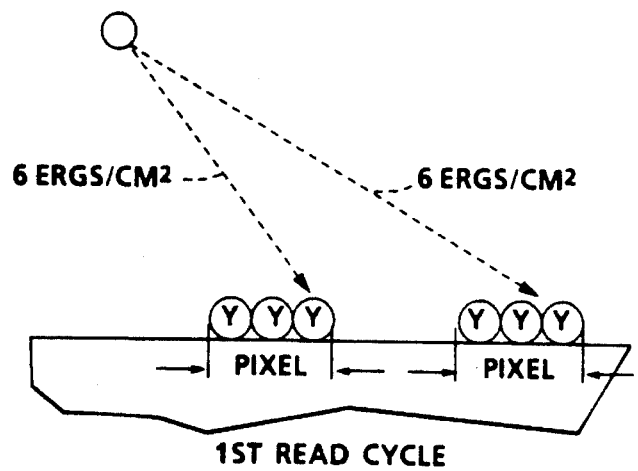
FIG. 6a, 6b and 6c are diagrams illustrating a pixel in various stages of development using adaptive exposure level for each pixel and exposure data of FIG. 5.
Figure 6B:
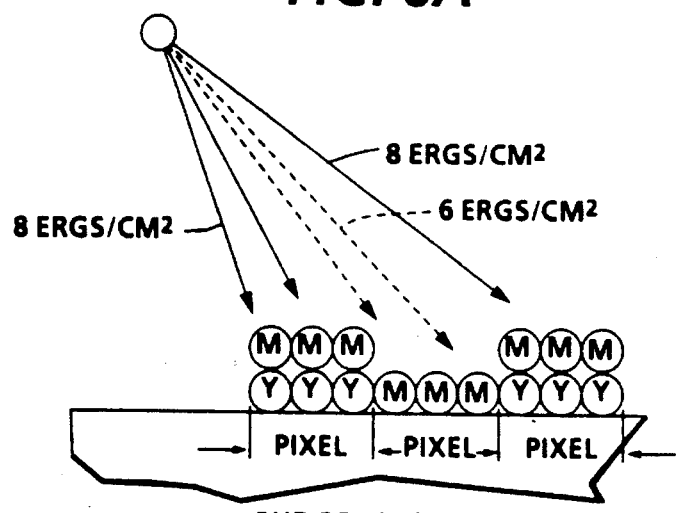
Figure 6C:
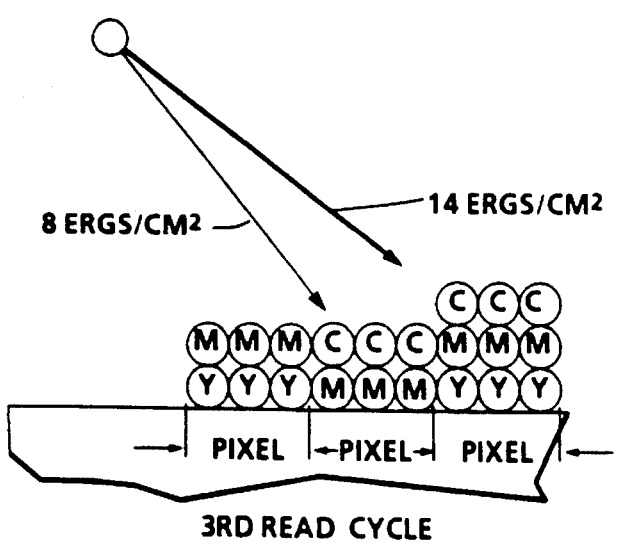

FIGS. 6a, 6b and 6c are diagrams illustrating the development of three pixels using an adaptive exposure level for each pixel from the data of FIG. 5. During the first REaD cycle, FIG. 6a, to develop yellow toner, the ROS exposes the first pixel to an exposure of 6 ergs/cm$^2$. The ROS is then turned off for the second pixel. For the third pixel, the ROS is turned on to an exposure of 6 ergs/cm$^2$. During the second REaD cycle, FIG. 6b, to develop magenta toner, the ROS exposes the first pixel to an adaptive exposure of 8 ergs/cm$^2$. For the second pixel, the intensity of the ROS is modulated to an adaptive exposure of 6 ergs/cm$^2$. The ROS intensity is modulated to an adaptive exposure of 8 ergs/cm$^2$ for the third pixel. During the third REaD cycle, FIG. 6c, to develop cyan toner, the ROS is turned off for the first pixel. For the second pixel the ROS is modulated to an adaptive exposure of 8 ergs/cm$^2$. The ROS is modulated to an adaptive exposure of 14 ergs/cm$^2$ for the third pixel. The resultant colors of each pixel by virtue of the three REaD cycles would be Red for the first pixel, Blue for the second pixel and Black for the third pixel.

Figure 9:
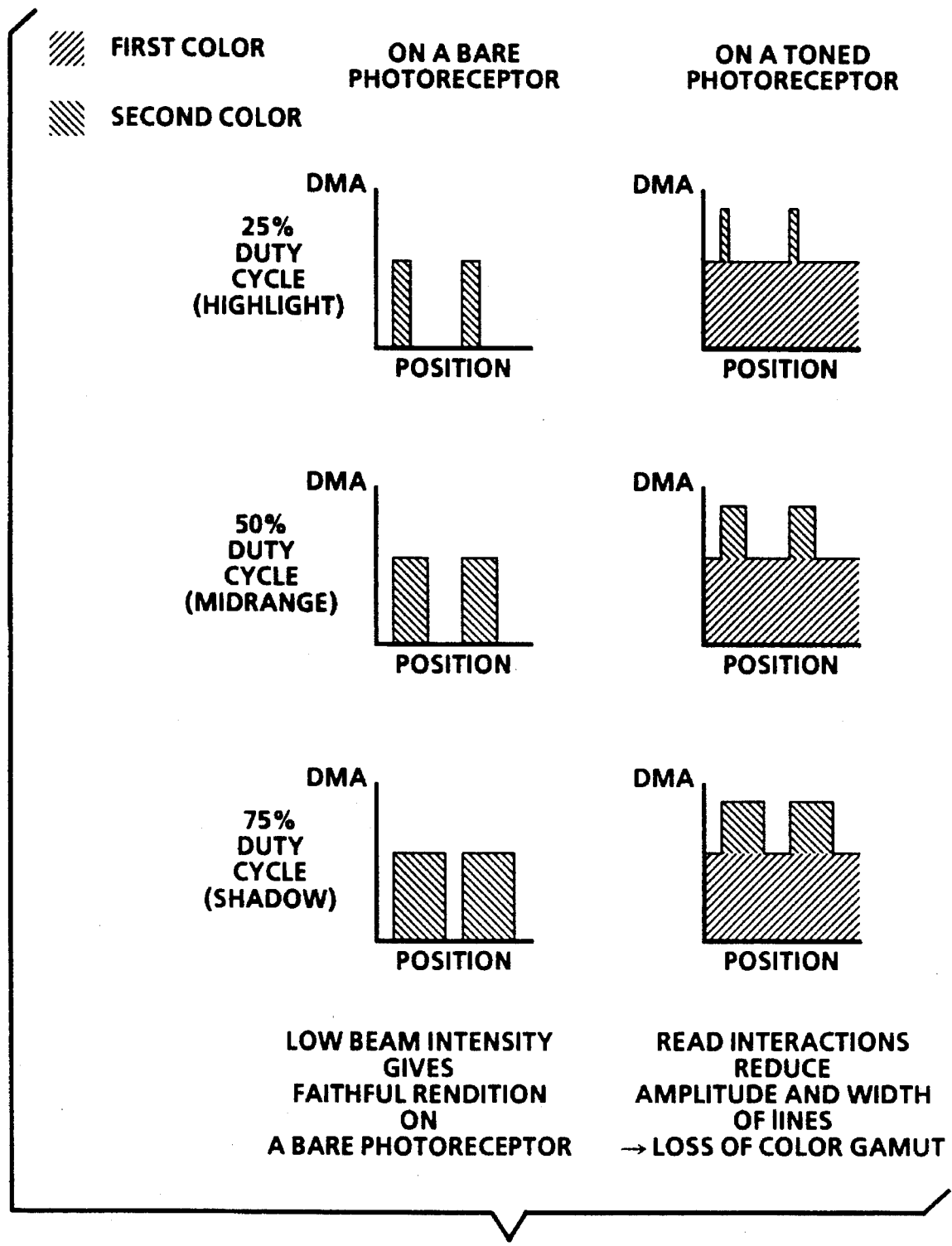
FIG. 9 shows prior art graphs of DMA as a function of position for line screen of various duty cycles on a bare photoreceptor surface.
Figure 10:
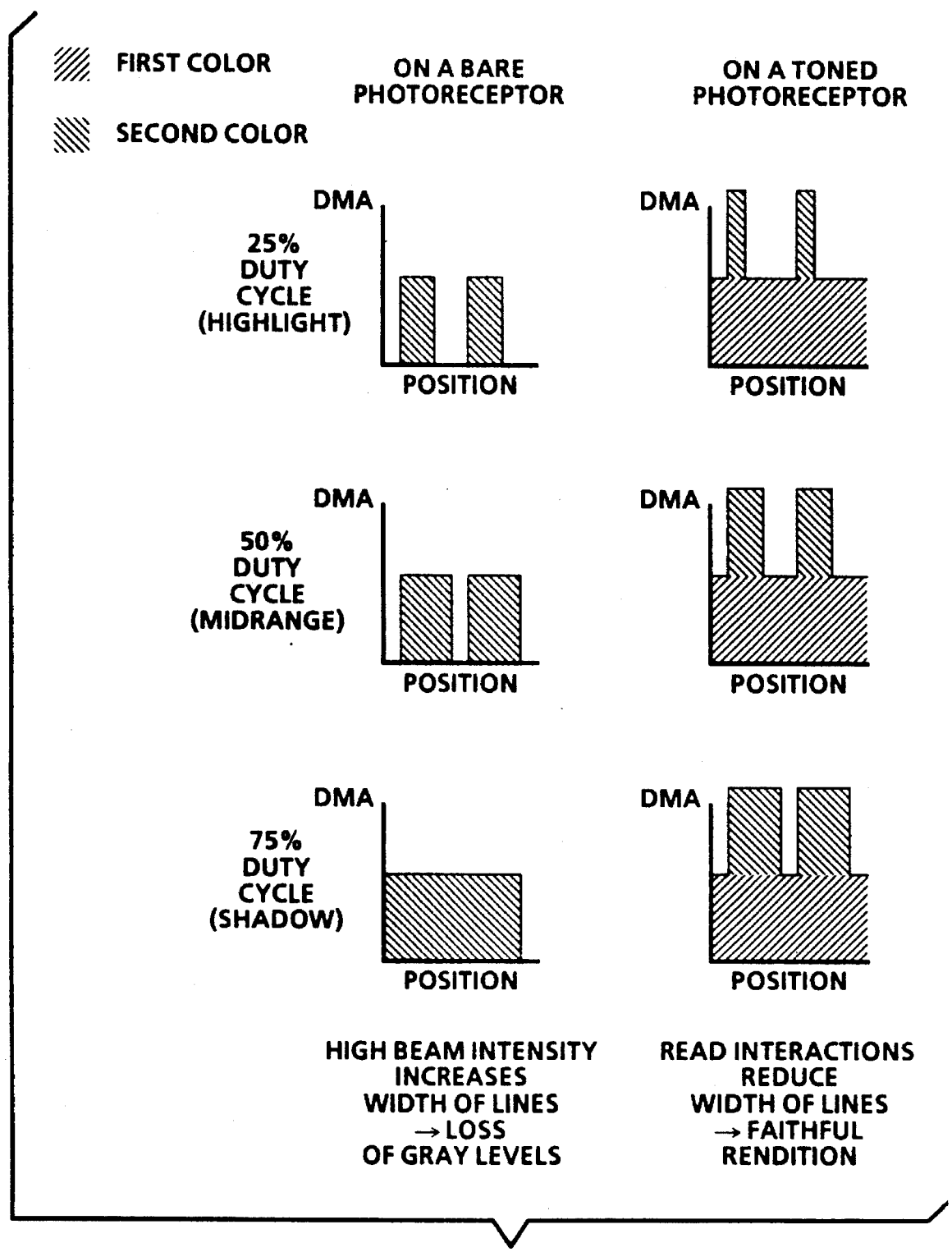
FIG. 10 shows prior art graphs of DMA as a function of position for line screens of various duty cycles on a previously toned photoreceptor.
Figure 11:
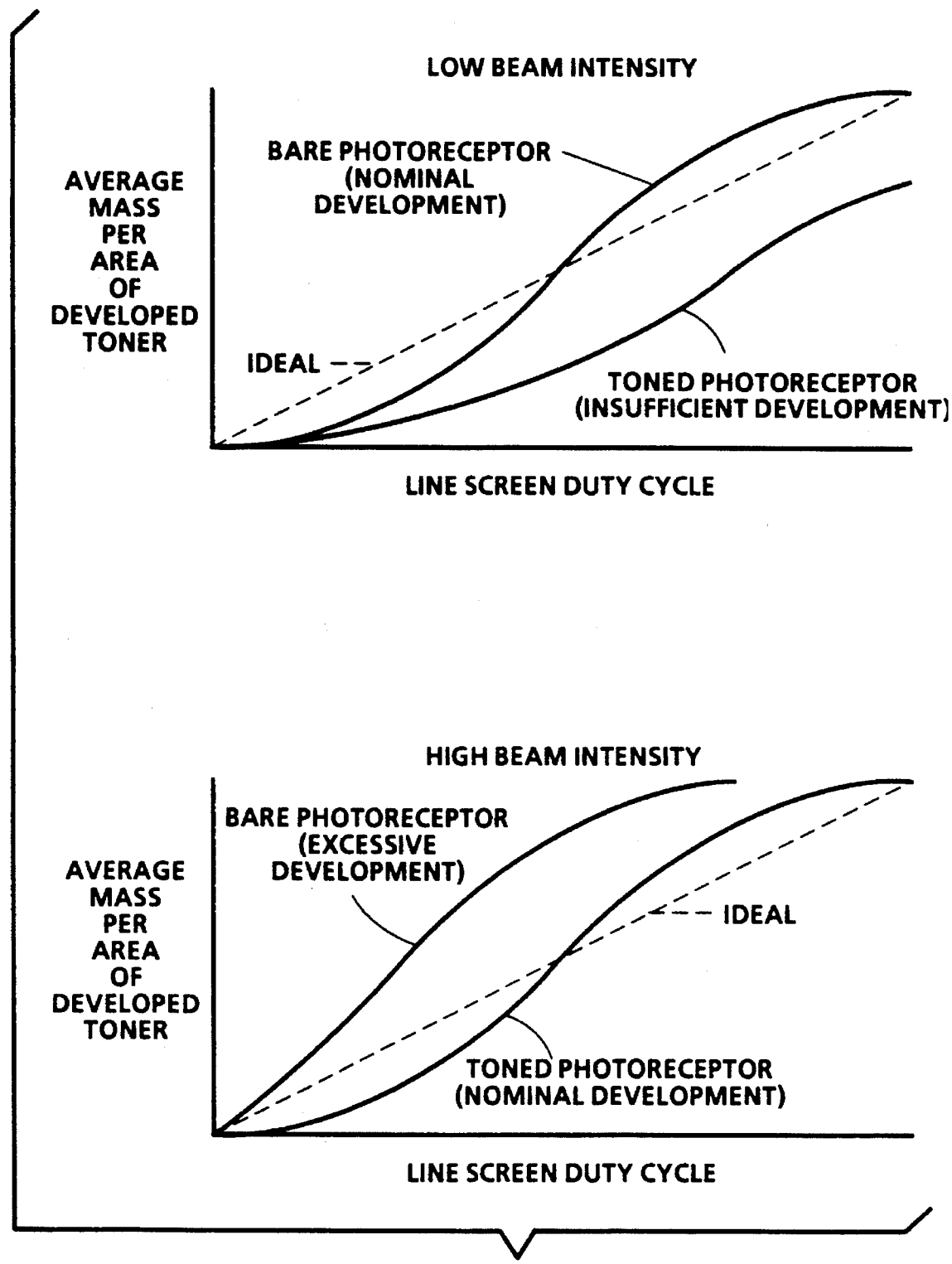
FIG. 11 shows prior art graphs of DMA versus line screen duty cycle.
Figure 12:
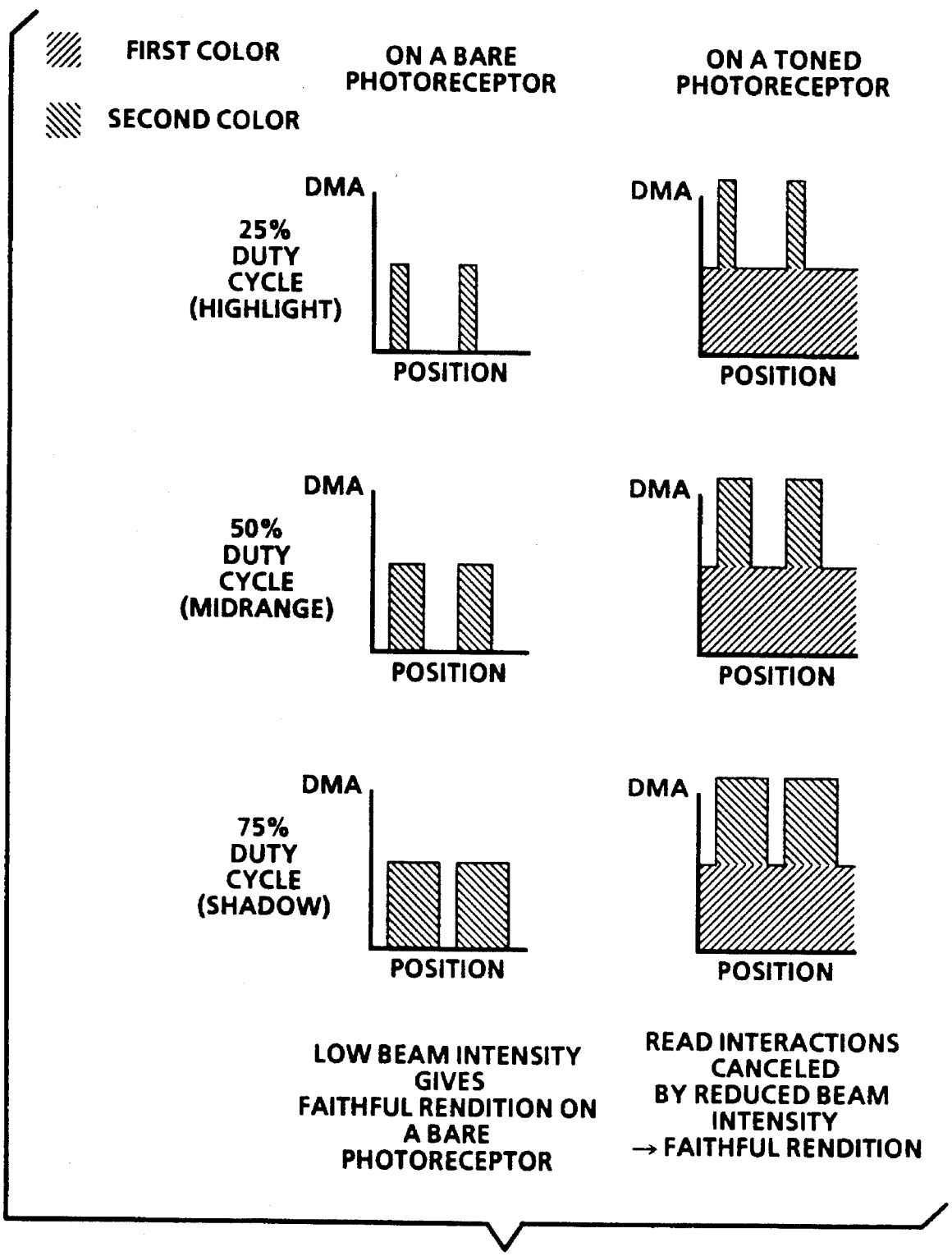
FIG. 12 shows graphs of DMA as a function of position for line screens of various duty cycles, for a printing machine using the adaptive exposure level technique of the present invention.

FIG. 12 depicts developed mass per area (DMA) as a function of position for line screens of various duty cycles, employing the adaptive exposure processing unit 66, the ROS beam intensity Adaptive Exposure is set differently, depending on previous development. Now the imaging is faithful for both toned and untoned areas as in comparison to previously discussed to FIGS. 9 and 10.

In recapitulation, a first image is developed on a photoconductive surface, the second and subsequent images are superimposed over the first developed image by a ROS that modulates the exposure level for a given pixel as a function of toner previously developed image at the pixel site. The exposure level value in which the ROS's light beam is modulated by the modulator is determined by examining the active part of the photo-discharge curve, accounting for the dielectric thickness effect of the toner previously developed at the pixel site, and the backscattering/absorption. The next step is to look up a correction factor for each pixel depending on some combination of the C, M, Y and Bk values at the pixel and applying that adaptive exposure level to the exposure of succeeding separations, either by changing the analog exposure value or employing some form of pulse width modulation. The result is that toner layers are made independent of each other.

It is, therefore, evident that there has been provided, in accordance with the present invention, an adaptive exposure processing unit that fully satisfies the aims and advantages hereinbefore set forth. While this invention has been described in conjunction with one embodiment thereof, it is evident that many alternatives, modifications and variations will be apparent to those skilled in the art. Accordingly, it is intended to embrace all such alternatives, modification and variations as fall within the spirit and broad scope of the appended claims.

We claim:

1. An electrophotographic printing machine, comprising:
   a photoconductive member;
   means for charging the photoconductive member;
   means for inputting an image signal;
   means, responsive to the image signal, for exposing the charged photoconductive member for recording an electrostatic latent image thereon;
   means for developing the electrostatic latent image with toner of a first color during a first cycle and toner of a second color during a second cycle to form a composite toner image on said photoconductive member;
   adaptive exposure processing means for modulating the exposure level of said exposing means for the second cycle as a function of the amount of toner developed on the electrostatic latent image recorded on said photoconductive member during the first cycle; and
   means for transferring the composite toner image from the photoconductive member to a copy sheet.

2. An electrophotographic printing machine apparatus according to claim 1, wherein said exposing means comprises means for modulating the light image pixel by pixel.

3. An electrophotographic printing machine apparatus according to claim 2, wherein said adaptive processing means comprises:
   pixel interpreter means for interpreting the color of each pixel;
   and means for correlating the color of each pixel with the modulation of said exposing means.

4. An electrophotographic printing machine apparatus according to claim 3, wherein said adaptive exposure processing means comprises look-up table means for determining exposure level, said look-up table means including correction values for each pixel of the image signal as a function of the combination of color components signal values inputted into said look-up table means.

5. An electrophotographic printing machine apparatus according to claim 4, wherein the correction values of said look-up table means are determined as a function active part of the photo-discharge curve of said photoconductive member, for the dielectric thickness effect of the toner previously developed at the pixel site on said photoconductive member, and the backscattering/absorption of the toner on said photoconductive member.

6. A method of producing a color copy in an electrophotographic printing machine, comprising the steps of:
   inputting an image signal including a plurality of color components;
   exposing a charged photoconductive surface to record an electrostatic latent image thereon;
   separating the image signal into a plurality of bit maps which represent the color of each pixel;
   examining and correlating the color of each pixel to the modulation of said exposing step;
   developing the latent image with toner of a first color during a first cycle and toner of a second color during a second cycle to form a composite toner image image on the photoconductive member; and determining a correction value from a look-up table as a function of the active part of the photo-discharge curve of the photoconductive surface, the dielectric thickness effect of the toner previously developed at the pixel site of the latent image recorded on the photoconductive surface during the prior cycle, and the backscattering/absorption of the toner developed on the latent image recorded on the photoconductive surface during the prior cycle; and transferring the composite toner image from the photoconductive member to a sheet.

* * * * *